(12) United States Patent
Østergaard et al.

(10) Patent No.: US 7,143,994 B2
(45) Date of Patent: Dec. 5, 2006

(54) COUPLING DEVICE

(75) Inventors: Inge Østergaard, Heggedal (NO); Erik Raad, Oslo (NO); Staale Svindland, Oslo (NO)

(73) Assignee: Vetco Aibel AS, Billingstad (NO)

( * ) Notice: Subject to any disclaimer, the term of this patent is extended or adjusted under 35 U.S.C. 154(b) by 3 days.

(21) Appl. No.: 10/894,052

(22) Filed: Jul. 20, 2004

(65) Prior Publication Data

US 2005/0056804 A1 Mar. 17, 2005

(30) Foreign Application Priority Data

Jul. 21, 2003 (NO) ................................. 20033279

(51) Int. Cl.
*F16L 37/00* (2006.01)
(52) U.S. Cl. ..................... 251/149.6; 251/282
(58) Field of Classification Search ............. 251/149.6, 251/281, 282
See application file for complete search history.

(56) References Cited

U.S. PATENT DOCUMENTS

| | | |
|---|---|---|
| 3,215,161 A | 11/1965 | Goodwin et al. |
| 4,703,774 A * | 11/1987 | Seehausen ............. 137/614.04 |
| 5,365,972 A | 11/1994 | Smith, III |
| 6,148,858 A * | 11/2000 | Kirkman ................ 137/614.02 |

FOREIGN PATENT DOCUMENTS

| | | |
|---|---|---|
| DE | 42 08 009 A1 | 6/1993 |
| GB | 2293221 A | 3/1996 |

* cited by examiner

*Primary Examiner*—J. Casimer Jacyna
(74) *Attorney, Agent, or Firm*—Venable LLP; Eric J. Franklin

(57) ABSTRACT

The invention relates to a coupling device including a coupling part provided with a coupling member and having an internal bore extending through the coupling part and its coupling member, wherein the coupling part is provided with a valve, which includes a valve body displaceably arranged inside the internal bore and a spring member acting on the valve body, the valve body being displaceable against the action of the spring member from a first position to a second position. The valve includes a housing fixed inside the internal bore, the housing being provided with a cavity accommodating the spring member and a part of the valve body. The cavity is in fluid communication with an orifice at the end of the valve facing the free end of the coupling member so as to allow the cavity to be in fluid communication with the surroundings via the orifice when the coupling member is out of engagement with a corresponding coupling member.

16 Claims, 4 Drawing Sheets

COUPLING DEVICE

CROSS-REFERENCE TO RELATED APPLICATIONS

This application claims priority under 35 U.S.C. § 119 to Norwegian patent application 200332789 filed Jul. 21, 2003.

FIELD OF THE INVENTION

The present invention relates to a coupling device.

BACKGROUND OF THE INVENTION

A coupling device according to the preamble of claim 1 is previously known from GB 2293221 A. This coupling device comprises a male coupling part, a corresponding female coupling part and an intermediate metal seal. The metal seal is preloaded by urging said coupling parts against each other. The male coupling part is provided with two projections which fit into helical grooves in the female coupling part, and the coupling parts are urged towards each other by a rotation of the male coupling part in relation to the female coupling part. In the coupling device according to GB 2293221 A, a valve of the type indicated in the preamble of claim 1 is arranged in the female coupling part. The spring member urging the valve body towards its advanced position, in which position the valve body closes the internal bore of the female coupling part, is arranged inside the internal bore in contact with the fluid therein. Consequently, the valve body will be subjected to the force from the spring member as well as the forces from the fluid pressure inside the internal bore. If the female coupling part is disconnected from the male coupling part there is a risk that the external pressure from the surrounding medium will cause an inwardly directed force on the valve body that exceeds the combined forces from the spring member and the fluid pressure inside the internal bore, in which case the valve body will be unable to close the internal bore and prevent an undesired exchange of fluids between the surroundings and the internal bore. This could for instance ensue when the coupling device is installed in a subsea environment at a great depth.

In this description and the subsequent claim, the term "fluid" refers to a flowing medium in gaseous or liquid form. Consequently, the expression "fluid-tight seal" implies a seal that is liquid-tight as well as gas-tight.

SUMMARY OF THE INVENTION

The object of the present invention is to provide a coupling device that eliminates the above-indicated drawback.

According to the invention, this object is achieved by a coupling device characterized in
that the valve comprises a housing which is fixed inside the internal bore of the first coupling part, said housing being provided with a cavity accommodating the spring member and a part of the valve body, and
that said cavity is in fluid communication with an orifice at the end of the valve facing the free end of the first coupling member so as to allow the cavity to be in fluid communication with the surroundings via said orifice when the first coupling member is out of engagement with the corresponding second coupling member.

Hereby, said cavity will have an internal pressure corresponding to the external pressure of the surrounding medium, which implies that the valve will be pressure balanced and insignificantly sensitive to differences between the pressure of the fluid in the internal bore and the pressure of the surrounding medium, given that the internal and external pressure respectively are effecting a cross sectional area having the same size, which reduces the risk of troubles in connection with the actuation of the valve during interconnection or disconnection of the coupling parts. When the coupling device is used in a subsea installation, said cavity will be filled with seawater of the same pressure as the surrounding seawater.

A preferred embodiment of the inventive coupling device is characterized in
that the valve body comprises a first body part and a second body part, said first body part being located in front of the second body part as seen in a direction along the internal bore of the first coupling part towards the first coupling member,
that a first flow path section is provided radially outwardly of the first body part between the valve housing and an inner wall of the internal bore of the first coupling part, and a second flow path section is provided between the second body part and said inner wall, said first and second flow path sections extending essentially in the axial direction of the internal bore of the first coupling part on mutually different levels as seen in the radial direction of the internal bore,
that the first flow path section is connected to the second flow path section via an intermediate flow path section extending obliquely in relation to the first and second flow path sections, and
that the first body part is adapted to block the intermediate flow path section when the valve body is displaced from said second position to said first position.

Hereby, the valve body will not be subjected to any axial forces by the fluid inside the internal bore of the first coupling part acting against the displacement of the valve body from said first position to said second position, which will facilitate the displacement of the valve body in connection with the interconnection of the coupling parts.

According to another preferred embodiment of the invention, the valve is provided with a ring-shaped sealing element arranged in an annular groove, which groove is provided in the inner wall of the internal bore of the first coupling part, an external surface of the valve body being adapted to engage with the sealing element so as to form a fluid-tight seal between the inner wall of the internal bore of the first coupling part and the valve body when the valve body is in said first position. Hereby, the internal bore of the first coupling part is sealed from the surroundings in a simple and efficient manner when the coupling device is disassembled.

Another preferred embodiment of the inventive coupling device is characterized in that the second body part has a smaller cross-sectional area than the first body part, that the second body part is surrounded by the sealing element and out of engagement therewith when the valve body is in said second position, that an external surface of the first body part is adapted to be brought into engagement with the sealing element so as to form a fluid-tight seal between the inner wall of the internal bore of the first coupling part and the valve body when the valve body is displaced from said second position to said first position, and that the end of the first body part facing the second body part only has blunt edges so that the sealing element will meet no sharp edge when the valve body is displaced between said positions. Hereby, the sealing element will only be subjected to minor wear by the valve body during the displacement of the valve body between said positions.

According to another preferred embodiment of the invention, the actuation member of the second coupling part is adapted to restrict the flow through the orifice when the first coupling member is in engagement with the second coupling member. Hereby, the fluid in the cavity accommodating the spring member will be prevented from mixing with the fluid flowing through the coupling device when the coupling device is assembled.

According to another preferred embodiment of the invention, said cavity is adapted to allow external pressure from surrounding medium to effect a cross sectional area which is identical to the cross sectional area effected by the internal fluid pressure, the two pressurised fluid media being sealed off from each other by a radial sealing element preferably arranged in an annular groove, which groove is provided in an internal surface being a part of the valve. Hereby, conditions for the valve to be pressure balanced is created.

According to another preferred embodiment of the invention, said cavity is in fluid communication with the orifice via a channel extending through the valve body, and the actuation member is adapted to engage with the valve body so as to cover the orifice and thereby restrict the flow through the orifice when the first coupling member is in engagement with the second coupling member. Hereby, the actuation member will automatically restrict the flow of fluid into and out of the cavity when the coupling device is assembled.

Another preferred embodiment of the inventive coupling device is characterized in that the second coupling member has an external spherical contact surface of metallic material, the first coupling member being provided with a corresponding internal conical contact surface of metallic material for engagement with the spherical contact surface of the second coupling member, and that the spherical contact surface of the second coupling member and the corresponding conical contact surface of the first coupling member are designed to form a fluid-tight seal between the first coupling part and the second coupling part when said contact surfaces are pressed against each other.

When the coupling device is assembled, i.e. when the coupling parts are pressed against each other, the mutually contacting coupling members form a metal seal which is capable of providing a reliable sealing effect even when the coupling parts and the associated coupling members are somewhat out of alignment with each other. Furthermore, by having a spherical contact surface and a corresponding conical contact surface at each end of the second coupling part, the sealing principle is that of compliancy with angular relative tolerances and eccentricity between the coupling parts, rather than forced axial alignment. This allows for less stringent tolerances to be accepted by the coupler device.

Further advantages as well as advantageous features of the coupling device according to the present invention will appear from the following description and the dependent claims.

BRIEF DESCRIPTION OF THE DRAWINGS

With reference to the appended drawings, a specific description of preferred embodiments of the invention cited as examples follows below.

In the drawings.

DETAILED DESCRIPTION OF PREFERRED EMBODIMENTS OF THE INVENTION

Figure 1:
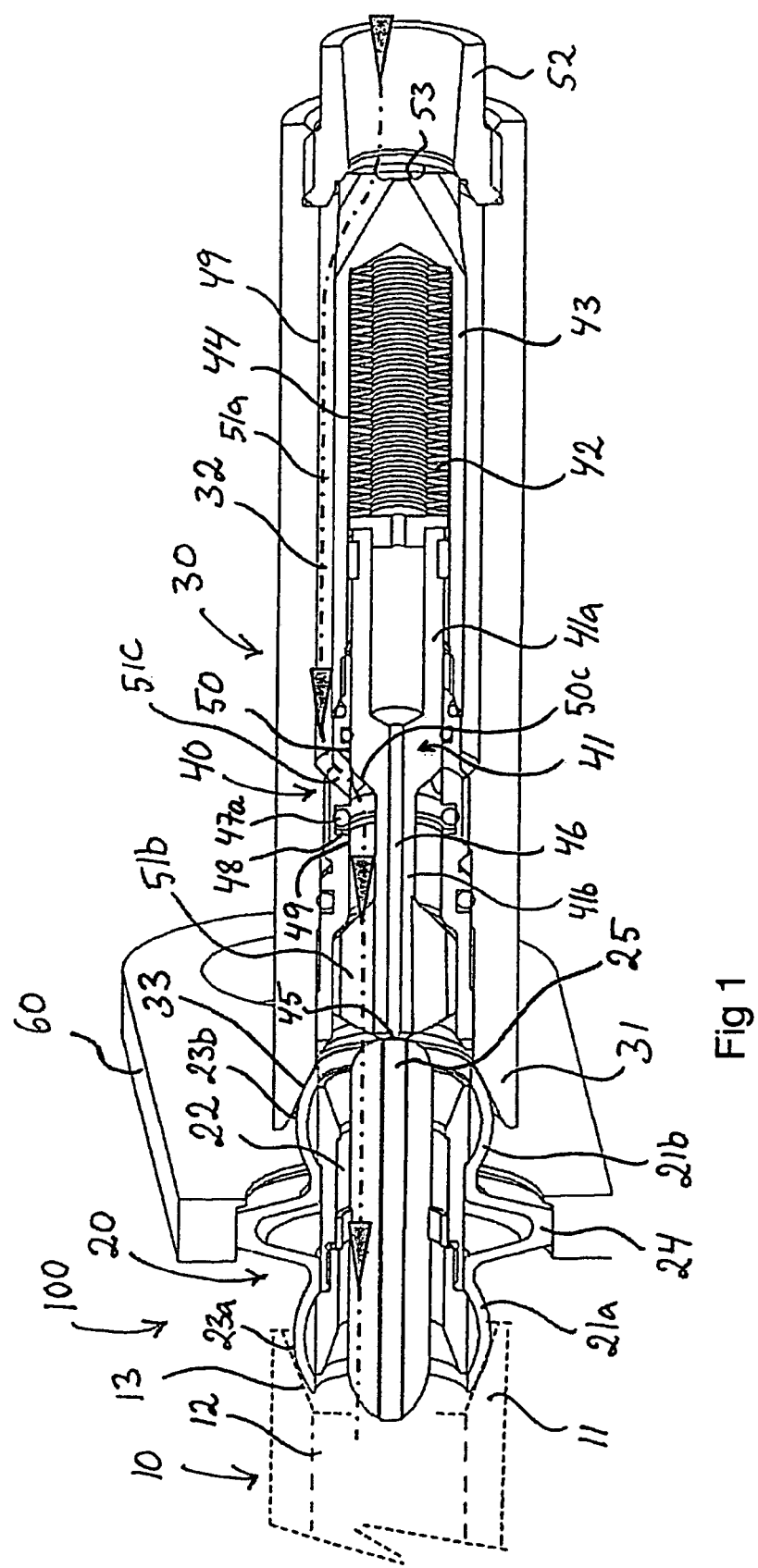
FIG. 1 is a schematical illustration of a first embodiment of a coupling device according to the invention as seen in a longitudinal section, with the valve of the first coupling part in an open position.

A coupling device 100 according to the present invention is illustrated in FIG. 1. This coupling device comprises a first coupling part 30, which is provided with a female first coupling member 31 and has an internal bore 32 extending through the coupling part 30 and the first coupling member 31, and a second coupling part 20, which is provided with a male second coupling member 21b and has an internal bore 22 extending through the coupling part 20 and the second coupling member 21b. The coupling device 100 further comprises valve means for automatically closing the internal bore 32 of the first coupling part 30 when the second coupling part 20 is brought out of engagement with the first coupling part and automatically opening said internal bore when the second coupling part is brought into engagement with the first coupling part.

According to the invention, the first coupling part 30 is provided with a valve 40, which comprises a valve body 41 displaceably arranged inside the internal bore 32 of the first coupling part and a spring member 42 acting on the valve body. The valve body 41 is displaceable against the action of the spring member 42 from a first position, in which the valve is closed and prevents fluid flow through the internal bore 32 of the first coupling part, to a second position, in which the valve is open and allows fluid flow through the internal bore of the first coupling part. The second coupling part 20 is provided with an actuation member 25 for displacing the valve body 41 from said first position to said second position immediately before the first coupling member 31 is brought into engagement with the corresponding second coupling member 21b. The actuation member 25 consists of a body fixed inside the internal bore 22 of the second coupling part, while allowing fluid to pass through the body via axial openings in the body and/or via areas between the external surface of the body and the inner wall of the bore 22. The actuation member 25 displaces the valve body 41 simply by pushing it inwards in the internal bore 32 of the first coupling part as the actuation member is moved towards the first coupling part together with the second coupling part.

The valve 40 comprises a housing 43 which is fixed, i.e. immovable mounted, inside the internal bore 32, of the first coupling part 30 by means of a fastening element 52, which is secured to the rear end of the housing 43 via a hub 53 and secured inside the bore 32. The fastening element 52 is tube-shaped so as to allow fluid to pass through it. The housing 43 has a cylindrically shaped front part with an opening at the forward end so as to form a cavity 44, which accommodates the spring member 42 and a rear part of the valve body 41. The valve body 41 forms a piston slidingly received in the cylindrical part of the housing 43. The spring member 42 is fixed between the rear end of the cavity 44 and the rear end of the valve body 41 so as to urge the valve body forward in the direction towards the free end of the first coupling part. The cavity 44 is in fluid communication with an orifice 45 at the end of the valve facing the free end of the first coupling part so as to allow the cavity to be in fluid communication with the surroundings via said orifice when the first coupling part 30 is out of engagement with the second coupling part 20. The cavity 44 is in fluid communication with the orifice 45 via a channel 46 extending axially through the valve body 41.

The actuation member 25 is adapted to restrict the flow through the orifice 45 when the first coupling member 31 is in engagement with the corresponding second coupling member 21b. In the illustrated embodiment, this is accomplished in that the actuation member 25 is adapted to engage with the valve body 41 so as to cover the orifice 45 and thereby restrict the flow through the orifice when the first coupling member 31 is in engagement with the corresponding second coupling member 21b.

Figure 2:
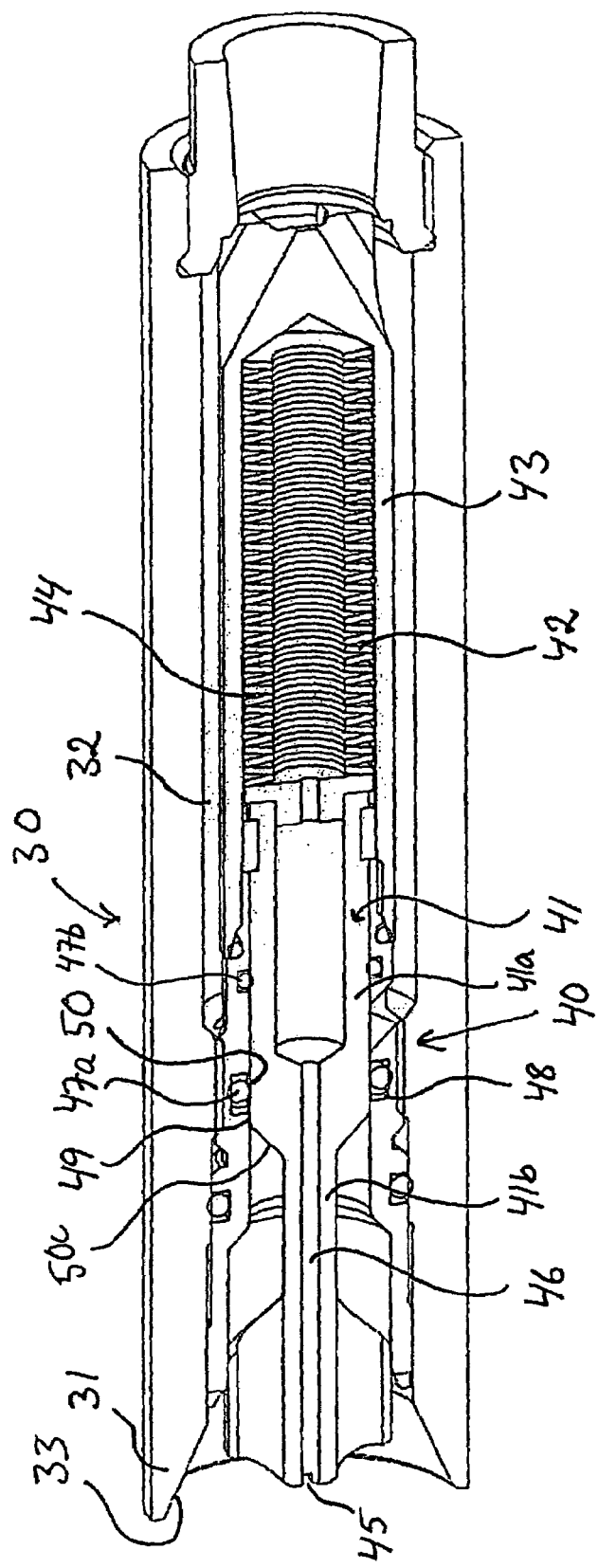
FIG. 2 is a schematical illustration of the first coupling part of FIG. 1, with the valve of the first coupling part in a closed position.

In the embodiment illustrated in FIGS. 1 and 2, the valve body 41 comprises a first body part 41a and a second body part 41b, said first body part 41a being located in front of the second body part 41b as seen in a direction along the internal bore 32 towards the first coupling member 31, i.e. towards the free end of the first coupling part 30. In FIG. 1, the flow path through the first female coupling part 30 is illustrated in a broken line. A first flow path section 51a is provided radially outwardly of the first body part 41a between the valve housing 43 and the inner wall 49 of the internal bore 32, and a second flow path section 51b is provided between the second body part 41b and said inner wall 49, said first and second flow path sections 51a, 51b extending essentially in the axial direction of the internal bore 32 on mutually different levels as seen in the radial direction of the internal bore. The first flow path section 51a is connected to the second flow path section 51b via an intermediate flow path section 51c extending obliquely in relation to the axial direction of the internal bore 32 and thereby obliquely to the first and second flow path sections 51a, 51b. The first body part 41a is adapted to allow fluid flow through the intermediate flow path section 51c when the valve body 41 is in its retracted second position, as illustrated in FIG. 1, and to block the intermediate flow path section 51c when the valve body 41 is displaced from said second position to its advanced first position, as illustrated in FIG. 2. The intermediate flow path section 51c is defined partly by an external surface 50c of the valve body 41 which extends obliquely, as seen in the axial direction of the valve body 41, between the first body part 41a and the second body part 41b.

The valve 40 is provided with a ring-shaped sealing element 47a arranged in an annular groove 48 provided in the inner wall 49 of the internal bore 32. An external surface 50 of the first part 41a of the valve body is adapted to engage with the sealing element 47a so as to form a fluid-tight seal between the inner wall 49 of the internal bore 32 and the valve body 41 when the valve body is in its advanced first position, as illustrated in FIG. 2. The second body part 41b has a smaller cross-sectional area than the first body part 41a and is surrounded by the sealing element 47a and out of engagement therewith when the valve body is in said second position, as illustrated in FIG. 1. The external surface of the first body part 41a is adapted to be brought into engagement with the sealing element 47a so as to form said fluid-tight seal when the valve body is displaced from said second position to said first position. In order to reduce wear on the sealing element 47a, the end of the first body part 41a facing the second body part 41b only has blunt edges so that the sealing element 47a will meet no sharp edge when the valve body is displaced between said positions.

The coupling device 100 might also comprise a third coupling part 10 identical with the above-mentioned first coupling part 30, as indicated with broken lines in FIG. 1. This third coupling part 10 is consequently provided with a female coupling member 11 and has an internal bore 12 extending through the coupling part 10 and the coupling member 11. The third coupling part 10 is further provided with a valve, not shown, identical with the above-described valve 40 of the first coupling part 30. The internal bore 12, 32 of the respective coupling part 10, 30 ends at an opening 15, 35 provided at the outer end of the associated coupling member 11, 31. The respective coupling part 10, 30 is here tube-shaped. In this case, the second coupling part 20 is provided with a male coupling member 21a at a first end thereof and another male coupling member 21b at a second end thereof, opposite said first end. The second coupling part 20 has its internal bore 22 extending through the coupling part 20 and both of its coupling members 21a, 21b. The internal bore 22 ends at openings 25a, 25b provided at the respective outer end of the male coupling members 21a, 21b. Consequently, the male coupling members 21a, 21b are connected to each other via the internal bore 22.

In the illustrated embodiment, the male coupling members 21a, 21b are each provided with an external spherical contact surface 23a, 23b of metallic material and the female coupling members 11, 31 are each provided with a corresponding internal conical contact surface 13, 33 of metallic material for engagement with the spherical contact surface 23a, 23b of the corresponding male coupling member 21a, 21b. The respective spherical contact surface 23a, 23b of the male coupling members 21a, 21b and the conical contact surface 13, 33 of the corresponding female coupling member 11, 31 are designed to form a fluid-tight seal between the second coupling part 20 and the corresponding coupling part 10, 30 when said contact surfaces 23a, 13 and 23b, 33 are pressed against each other. It is realised that the contact surfaces 13, 23a, 23b, 33 should have a suitable surface smoothness, and may have a thin layer of metal coating, galvanically applied, to improve surface finishing, so as to allow a fluid-tight contact between said contact surfaces. The respective contact surface 13, 23a, 23b, 33 is suitably of a corrosion resistant metallic material.

When the respective pair of coupling members 11, 21a and 31, 21b are pressed against each other so as to form a seal between the male coupling member 21a, 21b and the corresponding female coupling member 11, 31, said internal bores 12, 22, 32 will be interconnected so as to allow an internal flow of fluid through the coupling parts 10, 20, 30. The internal flow channel formed by these internal bores 12, 22, 32 will consequently be sealed from the surroundings by the seal formed between the respective pair of coupling members. The female coupling parts 10, 30 are e.g. intended to be connected to a respective fluid carrying conduit, so as to allow for an interconnection of these conduits.

At least one of the first and third coupling parts 10, 30 is displaceable in the axial direction towards and away from the opposite coupling part 30, 10 so as to make possible the assembling and disassembling of the coupling device. When the coupling device is to be assembled, the second coupling part 20 is located in the area between the first and third coupling parts 10, 30, whereupon the latter coupling parts 10, 30 are mutually displaced towards each other so as to clamp the second coupling part between them and establish the required sealing contact pressure between the respective male coupling member and the corresponding female coupling member. The first and third coupling parts 10, 30 are then secured in relation to each other. This displacing and securing of the coupling parts may be accomplished by any suitable means, which means will be described further below by way of example in connection to FIGS. 3 and 4.

It is realised that the coupling device is disassembled in the opposite order. During the operations of assembling and disassembling, the second coupling part 20 is suitably held in place axially by means of a suitable holder 60 (retainer plate), as illustrated in FIG. 1. The second coupling part 20 may hereby be independently retrieved for replacement or maintenance, i.e. without having to retrieve either of the first and third coupling parts 10, 30.

In the illustrated embodiment, the male coupling member 21a is connected to the other male coupling member 21b via an intermediate member 24, which forms a continuous part together with the male coupling members and which is mechanically compressible so as to be capable to store elastic energy when the second coupling part 20 is subjected to compression between the first coupling part 10 and the, third coupling part 30. The intermediate member 24 has an internal cross-sectional area which is larger than the external cross-sectional area of the respective male coupling member 21a, 21b as seen at the point P of the male coupling member where the male coupling member engages with the corresponding female coupling member 11, 31. Hereby, the intermediate member 24 is expandable in the axial direction of the second coupling part 20 by an internal fluid pressure in the coupling device 100, i.e. a fluid pressure inside the internal bore 22, so as to urge the respective male coupling member 21a, 21b against the corresponding female coupling member 11, 31, thereby increasing the sealing contact pressure between the respective male coupling member and the corresponding female coupling member. The intermediate member 24 is suitably of metallic material and is preferably essentially shaped as a single or multiple wave bellows. In the illustrated embodiment, the intermediate member is shaped as a single wave bellows. It is realised that the intermediate member 24 should have a wall thickness thin enough to give the intermediate member 24 the desired mechanical stiffness so as to allow for the axial compressions and expansions thereof, still maintaining safe allowable stresses and deflections.

The coupling device 100 of the present invention is suitable for use as a hydraulic subsea coupling, e.g. for coupling together conduits belonging to interconnectable processing modules in a fluid-tight manner. It should, however, be evident to a person skilled in the art that the coupling device according to the present invention may be used for many other purposes where a flexible and fluid-tight seal is required.

Figure 3:
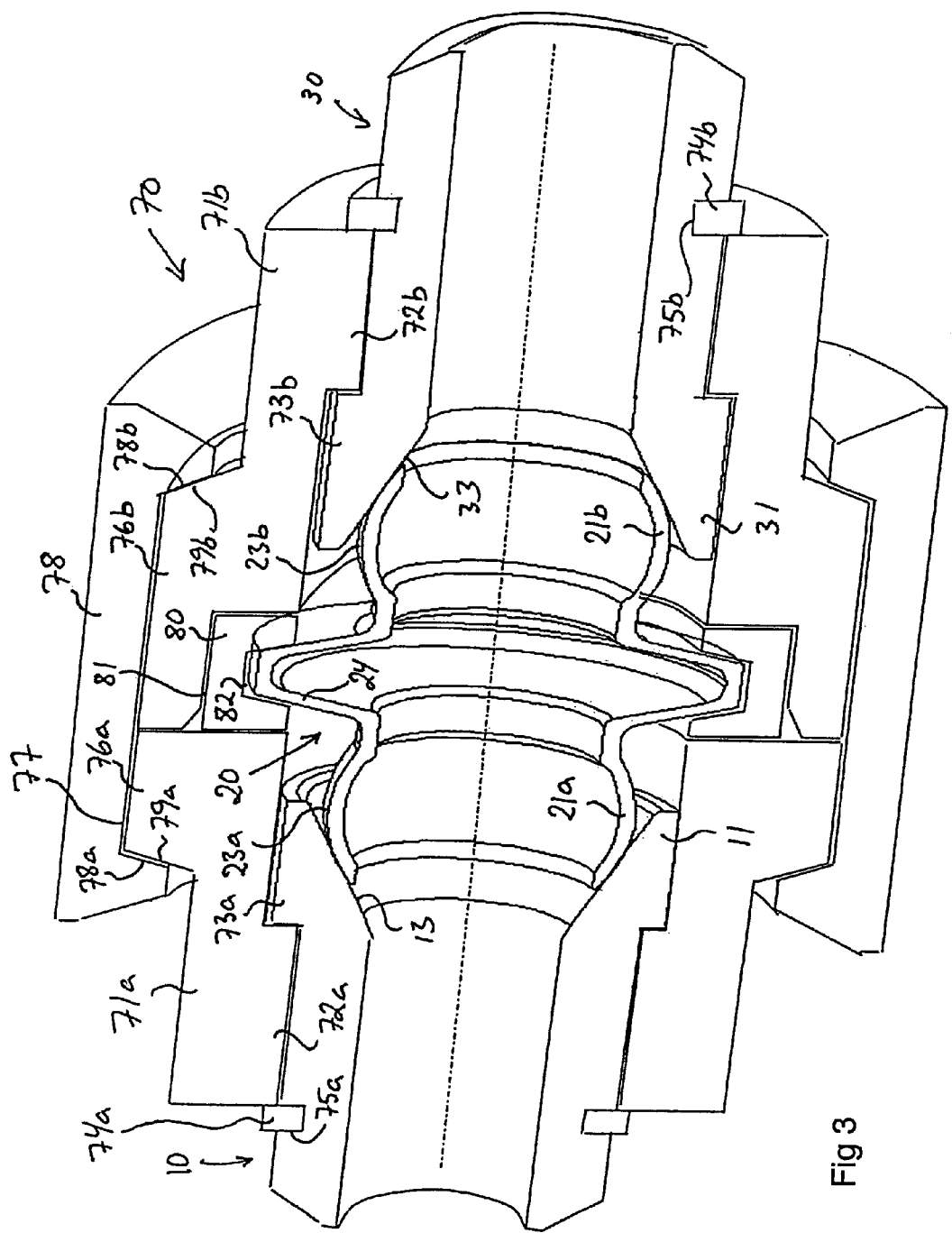
FIG. 3 is a schematical illustration of a second embodiment of a coupling device according to the invention as seen in a longitudinal section.

An alternative embodiment of a coupling device according to the present invention is illustrated in FIG. 3. This coupling device comprises two female coupling parts 10, 30, an intermediate male coupling part 20 and associated coupling members 11, 21a, 21b, 31 with contact surfaces 13, 23a, 23b, 33 of the configurations described with reference to FIGS. 1 and 2. The female coupling parts 10, 30 are further provided with valves 40 (not shown in FIG. 3) and the male coupling part 20 is provided with an actuation member 25 (not shown in FIG. 3) of the configurations described with reference to FIGS. 1 and 2. The coupling device is here provided with a clamping arrangement 70 for securing the two female coupling parts 10, 30 in relation to each other with the male coupling part 20 clamped between them. The clamping arrangement 70 comprises a first flange ring 71a and a second flange ring 71b. The first flange ring 71a is secured on the outside of the first female coupling part 10 in engagement with the external wall thereof. The flange ring 71a comprises an inwardly protruding part 72a which is received between a flange 73a surrounding the outer free end of the coupling part 10 and a retaining ring 74a arranged in a groove 75a in the external wall of the coupling part 10. The second flange ring 71b is secured on the outside of the second female coupling part 30 in engagement with the external wall thereof. The flange ring 71b comprises an inwardly protruding part 72b which is received between a flange 73b surrounding the outer free end of the coupling part 30 and a retaining ring 74b arranged in a groove 75b in the external wall of the coupling part 30. The respective flange ring 71a, 71b is provided with an outwardly protruding part 76a, 76b received in an annular recess 77 of a clamp shell 78. The clamp shell 78 is arranged to surround the protruding parts 76a, 76b of the flange rings 71a, 71b. The flange rings 71a, 71b are forced towards each other by pressing the clamp shell inwards, due to the engagement between the inclined side walls 78a, 78b of the recess 77 and the corresponding inclined side walls 79a, 79b of the protruding parts 76a, 76b. The clamping arrangement 70 also comprises a seal retainer plate 80 received inside a recess 81 formed between the first flange ring 71a and the second flange ring 71b. The seal retainer plate 80 is provided with an annular inner recess 82 surrounding the intermediate member 24 of the male coupling part 20 and accommodating the outer edge of the bellows of said intermediate member 24.

Figure 4:
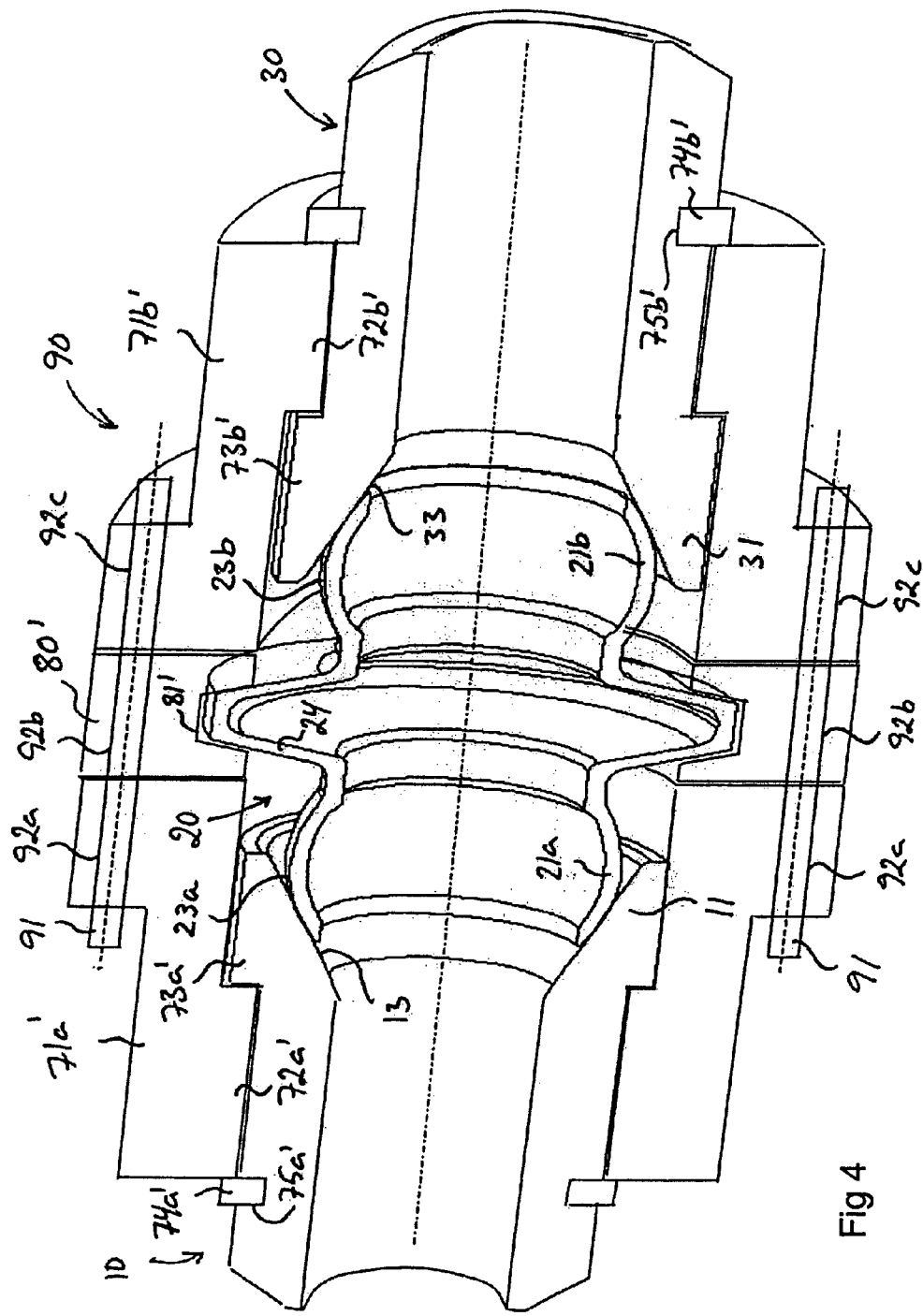
FIG. 4 is a schematical illustration of a third embodiment of a coupling device according to the invention as seen in a longitudinal section.

Another alternative embodiment of a coupling device according to the present invention is illustrated in FIG. 4. This coupling device comprises two female coupling parts 10, 30, an intermediate male coupling part 20 and associated coupling members 11, 21a, 21b, 31 with contact surfaces 13, 23a, 23b, 33 of the configurations described with reference to FIGS. 1 and 2. The female coupling parts 10, 30 are further provided with valves 40 (not shown in FIG. 4) and the male coupling part 20 is provided with an actuation member 25 (not shown in FIG. 4) of the configurations described with reference to FIGS. 1 and 2. The coupling device is here provided with a bolted securing arrangement 90 for securing the two female coupling parts 10, 30 in relation to each other with the male coupling part 20 clamped between them. The clamping arrangement 90 comprises a first flange ring 71a' and a second flange ring 71b'. The first flange ring 71a' is secured on the outside of the first female coupling part 10 in engagement with the external wall thereof. The flange ring 71a' comprises an inwardly protruding part 72a' which is received between a flange 73a' surrounding the outer free end of the coupling part 10 and a retaining ring 74a' arranged in a groove 75a' in the external wall of the coupling part 10. The second flange ring 71b' is secured on the outside of the second female coupling part 30 in engagement with the external wall thereof. The flange ring 71b' comprises an inwardly protruding part 72b' which is received between a flange 73b' surrounding the outer free end of the coupling part 30 and a retaining ring 74b' arranged in a groove 75b' in the external wall of the coupling part 30. The respective flange ring 71a', 71b' is provided with an outwardly protruding part 76a', 76b'. The securing arrangement 90 also comprises a seal retainer plate 80' received between the first flange ring 71a' and the second flange ring 71b'. The seal retainer plate 80' is provided with an annular inner recess 81' surrounding the intermediate member 24 of the male coupling part 20 and accommodating the outer edge of the bellows of said intermediate member 24. A number of bolts 91 are each arranged in a respective set of mutually aligned through holes 92a, 92b, 92c extending through the flange rings 71a', 71b' and the intermediate seal retainer plate 80' in the axial direction of the coupling parts 10, 20, 30. The flange rings 71a', 71b' and the intermediate seal retainer plate 80' are pressed against each other and secured to each other by means of these bolts 91, thereby securing the coupling parts 10, 20, 30 to each other.

From FIG. 1 which shows the valve of the first coupling part in an open position and FIG. 2 which shows the valve of the first coupling part in a closed position, it is realized that the coupling device according to the present invention makes use of radial sealing elements for opening and closing of the flowing through of the fluid.

The invention is of course not in any way restricted to the preferred embodiments described above. On the contrary, many possibilities to modifications thereof will be apparent to a person with ordinary skill in the art without departing from the basic idea of the invention such as defined in the appended claims.

The invention claimed is:

1. A coupling device comprising:
    a first coupling part provided with a first coupling member and having an internal bore extending through the coupling part and its coupling member; and
    a second coupling part provided with a second coupling member and having an internal bore extending through the coupling part and its coupling member, said second coupling member being engageable in a fluid-tight manner with the first coupling member;
    wherein the first coupling part is provided with a valve, which comprises a valve body displaceably arranged inside the internal bore of the first coupling part and a spring member acting on the valve body, the valve body being displaceable against the action of the spring member from a first position, in which the valve is closed and prevents fluid flow through the internal bore of the first coupling part, to a second position, in which the valve is open and allows fluid flow through the internal bore of the first coupling part,
    wherein the valve comprises a housing which is fixed inside the internal bore of the first coupling part, said housing being provided with a cavity accommodating the spring member and a part of the valve body,
    wherein said cavity is in fluid communication with an orifice at the end of the valve facing the free end of the first coupling member so as to allow the cavity to be in fluid communication with the surroundings via said orifice when the first coupling member is out of engagement with the corresponding second coupling member,
    the second coupling member has an external spherical contact surface of metallic material, the first coupling member being provided with a corresponding internal conical contact surface of metallic material for engagement with the spherical contact surface of the second coupling member, and
    the spherical contact surface of the second coupling member and the corresponding conical contact surface of the first coupling member are designed to form a fluid-tight seal between the first coupling part and the second coupling part when said contact surfaces are pressed against each other.

2. The coupling device according to claim 1, wherein
    the valve body comprises a first body part and a second body part, said first body part being located in front of the second body part as seen in a direction along the internal bore of the first coupling part towards the first coupling member,
    a first flow path section is provided radially outwardly of the first body part between the valve housing and an inner wall of the internal bore of the first coupling part, and a second flow path section is provided between the second body part and said inner wall, said first and second flow path sections extending essentially in the axial direction of the internal bore of the first coupling part on mutually different levels as seen in the radial direction of the internal bore,
    the first flow path section is connected to the second flow path section via an intermediate flow path section extending obliquely in relation to the first and second flow path sections, and
    the first body part is adapted to block the intermediate flow path section when the valve body is displaced from said second position to said first position.

3. A coupling device according to claim 2, wherein the intermediate flow path section is defined partly by an external surface of the valve body which extends obliquely, as seen in the axial direction of the valve body, between the first body part and the second body part.

4. A coupling device according to claim 1, wherein
    the valve is provided with a ring-shaped sealing element arranged in an annular groove, which groove is provided in the inner wall of the internal bore of the first coupling part, and
    an external surface of the valve body is adapted to engage with the sealing element so as to form a fluid-tight seal between said inner wall and the valve body when the valve body is in said first position.

5. The coupling device according to claim 4, wherein the second body part has a smaller cross-sectional area than the first body part, wherein the second body part is surrounded by the sealing element and out of engagement therewith when the valve body is in said second position, wherein an external surface of the first body part is adapted to be brought into engagement with the sealing element so as to form a fluid-tight seal between the inner wall of the internal bore of the first coupling part and the valve body when the valve body is displaced from said second position to said first position, and that the end of the first body part facing the second body part only has blunt edges so that the sealing element will meet no sharp edge when the valve body is displaced between said positions.

6. The coupling device according to claim 1, wherein the second coupling part is provided with an actuation member for displacing the valve body from said first position to said second position immediately before the first coupling member is brought into engagement with the second coupling member.

7. The coupling device according to claim 6, wherein the actuation member is adapted to restrict the flow through the orifice when the first coupling member is in engagement with the second coupling member.

8. The coupling device according to claim 2, wherein the cavity is adapted to allow external pressure from surrounding medium to effect a cross sectional area which is identical to the cross sectional area effected by the internal pressure, the pressurised fluid media being sealed off from each other by a sealing element arranged in an annular groove, which groove is provided in an internal surface being a part of the valve.

9. The coupling device according to claim 6, wherein the cavity is in fluid communication with the orifice via a channel extending through the valve body.

10. The coupling device according to claim 9, wherein said channel extends axially through the valve body.

11. The coupling device according to claim 6, wherein the actuation member is adapted to engage with the valve body so as to cover the orifice and thereby restrict the flow through the orifice when the first coupling member is in engagement with the second coupling member.

12. The coupling device according to claim 1, wherein the first coupling part is provided with a female first coupling member.

13. The coupling device according to claim 1, wherein the coupling device constitutes a hydraulic subsea coupling.

14. The coupling device according to claim 1, wherein the second coupling part is provided with a male second coupling member.

15. The coupling device according to claim 1, further comprising:
 a third coupling part having a third coupling member, the second coupling part having an additional coupling member which is engageable in a fluid-tight manner with the third coupling member.

16. The coupling device according to claim 1, wherein the coupling device constitutes a hydraulic subsea coupling.

\* \* \* \* \*